(12) United States Patent
Miyano et al.

(10) Patent No.: US 8,145,694 B2
(45) Date of Patent: Mar. 27, 2012

(54) FAST FOURIER TRANSFORMATION CIRCUIT

(75) Inventors: Kentaro Miyano, Kanagawa (JP); Katsuaki Abe, Kanagawa (JP); Akihiko Matsuoka, Kanagawa (JP)

(73) Assignee: Panasonic Corporation, Osaka (JP)

( * ) Notice: Subject to any disclaimer, the term of this patent is extended or adjusted under 35 U.S.C. 154(b) by 978 days.

(21) Appl. No.: 12/094,966

(22) PCT Filed: Nov. 16, 2006

(86) PCT No.: PCT/JP2006/322885
§ 371 (c)(1),
(2), (4) Date: May 23, 2008

(87) PCT Pub. No.: WO2007/060879
PCT Pub. Date: May 31, 2007

(65) Prior Publication Data
US 2009/0150470 A1    Jun. 11, 2009

(30) Foreign Application Priority Data
Nov. 25, 2005   (JP) .................................. 2005-340148

(51) Int. Cl.
*G06F 17/14* (2006.01)
(52) U.S. Cl. ...................................................... 708/404
(58) Field of Classification Search .................. None
See application file for complete search history.

(56) References Cited

U.S. PATENT DOCUMENTS

| | | | | |
|---|---|---|---|---|
| 5,473,556 A | * | 12/1995 | Aguilar et al. | 708/404 |
| 6,247,034 B1 | * | 6/2001 | Nakai et al. | 708/409 |
| 6,963,892 B2 | * | 11/2005 | Jin et al. | 708/404 |
| 6,988,117 B2 | * | 1/2006 | Vinitzky | 708/400 |
| 7,062,523 B1 | * | 6/2006 | Hoffman et al. | 708/404 |
| 7,653,676 B2 | * | 1/2010 | Su | 708/404 |
| 7,669,017 B1 | * | 2/2010 | Parekh et al. | 711/154 |

FOREIGN PATENT DOCUMENTS

| | | |
|---|---|---|
| JP | 6-19955 | 1/1994 |
| JP | 6-195368 | 7/1994 |
| JP | 10-283341 | 10/1998 |
| JP | 2000-123000 | 4/2000 |
| JP | 2002-117015 | 4/2002 |
| JP | 2002-312343 | 10/2002 |
| JP | 2004-186852 | 7/2004 |

OTHER PUBLICATIONS

International Search Report dated Jan. 23, 2007.
J. Kuo, et al., "VLSI Design of a Variable-Length FFT/IFFT Processor for OFDM-Based Communication Systems," EURASIP Journal on Applied Signal Processing, vol. 2003, No. 13, 2003, pp. 1306-1316.

* cited by examiner

*Primary Examiner* — David H Malzahn
(74) *Attorney, Agent, or Firm* — Dickinson Wright PLLC

(57) ABSTRACT

Provided is a fast Fourier transformation circuit capable of optimizing an operation resource while matching a plurality of communication systems. In this circuit, an FFT circuit (100) comprises a first FFT operation unit (110) for subjecting two-parallel 2<M−1> digital signals to FFT operations of (M−1) steps, a second FFT operation unit (120) for subjecting 2<N> digital signals to FFT operations of (N−M+1) steps, and a third FFT operation unit (130) for subjecting 2<M> digital signals to an FFT operation of one step. The output signal of the first FFT operation unit (110) is subjected to the FFT operation by the second FFT operation unit (120) and the third FFT operation unit (130) thereby to perform the FFT operations of 2<N> points and 2<M> points simultaneously.

14 Claims, 11 Drawing Sheets

FAST FOURIER TRANSFORMATION CIRCUIT

TECHNICAL FIELD

The present invention relates to a fast Fourier transform circuit.

BACKGROUND ART

Conventional fast Fourier transform circuits that support a plurality of communication schemes (hereinafter "multimode fast Fourier transform circuits") include, for example, the one disclosed in Patent Document 1.

FIG. 1 is a block diagram showing a configuration of the conventional multimode fast Fourier transform circuit disclosed in Patent Document 1.

Multimode fast Fourier transform circuit 1 shown in FIG. 1 employs a configuration having serial/parallel conversion circuit 11, serial/parallel conversion circuit 12, switch 13, FFT (Fast Fourier Transform) circuit 14, parallel/serial conversion circuit 15, puncturing circuit 16, amplitude adjusting circuit 17, zero-signal generating circuit 18, serial/parallel conversion circuit 19 and combiner 20.

This circuit 1 supports the OFDM (Orthogonal Frequency Division Multiplexing) scheme requiring FFT processing for P (=2048) points and the OFDM scheme requiring FFT processing for Q (=64) points and performs FFT processing for P points in either scheme. Here, when circuit 1 receives a signal of the OFDM scheme requiring FFT processing for Q points, FFT processing for P points is performed by combining the received signal and data of zero values outputted from zero-signal generating circuit 18 in combiner 20 and converting Q sequences of parallel data into P sequences of parallel data.

Patent Document 1: Japanese Patent Application Laid-open No. 2004-186852 (FIG. 3)

DISCLOSURE OF INVENTION

Problems to be Solved by the Invention

However, in the above-noted conventional multimode FFT circuit, FFT processing for P points is performed to even receive a signal of the OFDM scheme requiring FFT processing for Q (Q<P) points, and, consequently, a more computation is performed, which causes a problem of not optimizing resources for computation.

Further, recently, demands for communication apparatuses having a TV receiving function have increased. Consequently, to receive TV broadcasts during communication, multimode FFT circuits that can perform FFT on a plurality of arbitrary communication schemes (not limited to the OFDM scheme) are demanded. With these multimode FFT circuits, optimizing resources for computation to improve the efficiency of a plurality of FFT processing makes it possible to miniaturize the circuit and save power consumption, and is quite useful.

It is therefore an object of the present invention to provide a FFT circuit that supports a plurality of communication schemes and optimizes resources for computation.

Means for Solving the Problem

The fast Fourier transform circuit of the present invention employs a configuration having: a first buffer that accumulates $2^N$ (N is a natural number) digital signals, and outputs a digital signal in which an order of bits is rearranged into a position of a bit reversed order where the order of the bits is reversed; a second buffer that accumulates $2^M$ (M is a natural number and is equal to or less than N) digital signals, and outputs a digital signal in which an order of bits is rearranged into a position of a bit reversed order; a first fast Fourier transform processing section that performs first butterfly computation processing on the digital signal outputted from the first buffer and performs second butterfly computation processing on the digital signal outputted from the second buffer; a second fast Fourier transform processing section that performs butterfly computation processing on the digital signal after the first butterfly computation processing; and a third fast Fourier transform processing section that performs butterfly computation processing on the digital signal after the second butterfly computation processing.

Further, the fast Fourier transform circuit of the present invention employs a configuration having: a first buffer that accumulates $2^N$ (N is a natural number) digital signals, and outputs a digital signal in which an order of bits is rearranged into a position of a bit reversed order where the order of the bits is reversed; a second buffer that accumulates $2^M$ (M is a natural number and is equal to or less than N) digital signals, and outputs a digital signal in which an order of bits is rearranged into a position of a bit reversed order; a first fast Fourier transform processing section that performs first butterfly computation processing on the digital signals outputted from the first buffer and performs second butterfly computation processing on the digital signal outputted from the second buffer; a second fast Fourier transform processing section that performs third butterfly computation processing on the digital signal after the first butterfly computation processing and performs fourth butterfly computation processing on the digital signal after the second butterfly computation processing; and a third fast Fourier transform processing section that performs the butterfly computation processing on the digital signal after the third butterfly computation processing.

Further, the fast Fourier transform circuit of the present invention employs a configuration having: a first buffer that accumulates $2^N$ (N is a natural number) digital signals, and outputs a digital signal in which an order of bits is rearranged into a position of a bit reversed order where the order of the bits is reversed; a second buffer that accumulates $2^M$ (M is a natural number and equal to or less than N) digital signals, and outputs a digital signal in which an order of bits is rearranged into a position of a bit reversed order; N data accumulating sections that are connected with a side of a subsequent stage of the first buffer, and accumulate digital signals; (N−1) data accumulating sections that are connected with a side of a subsequent stage of the second buffer and accumulate the digital signals; N butterfly computation sections that perform butterfly computation processing on the digital signals accumulated in the N data accumulating sections in the first step to the N-th step and perform butterfly computation processing on the digital signals accumulated in (N−1) data accumulating sections in the first step to the (N−1)-th step; and N switches that switch an output destination of the digital signals inputted from the first or second buffer and the N butterfly computation sections, and the configuration where the N switches each output the inputted digital signals to a next data accumulating section or a switch in a next stage according to a setting.

ADVANTAGEOUS EFFECT OF THE INVENTION

According to the present invention, it is possible to support a plurality of communication schemes and optimize resources for computation.

BEST MODE FOR CARRYING OUT THE INVENTION

Embodiments of the present invention will be explained below in detail, with reference to the accompanying drawings.

(Embodiment 1)

Figure 1:
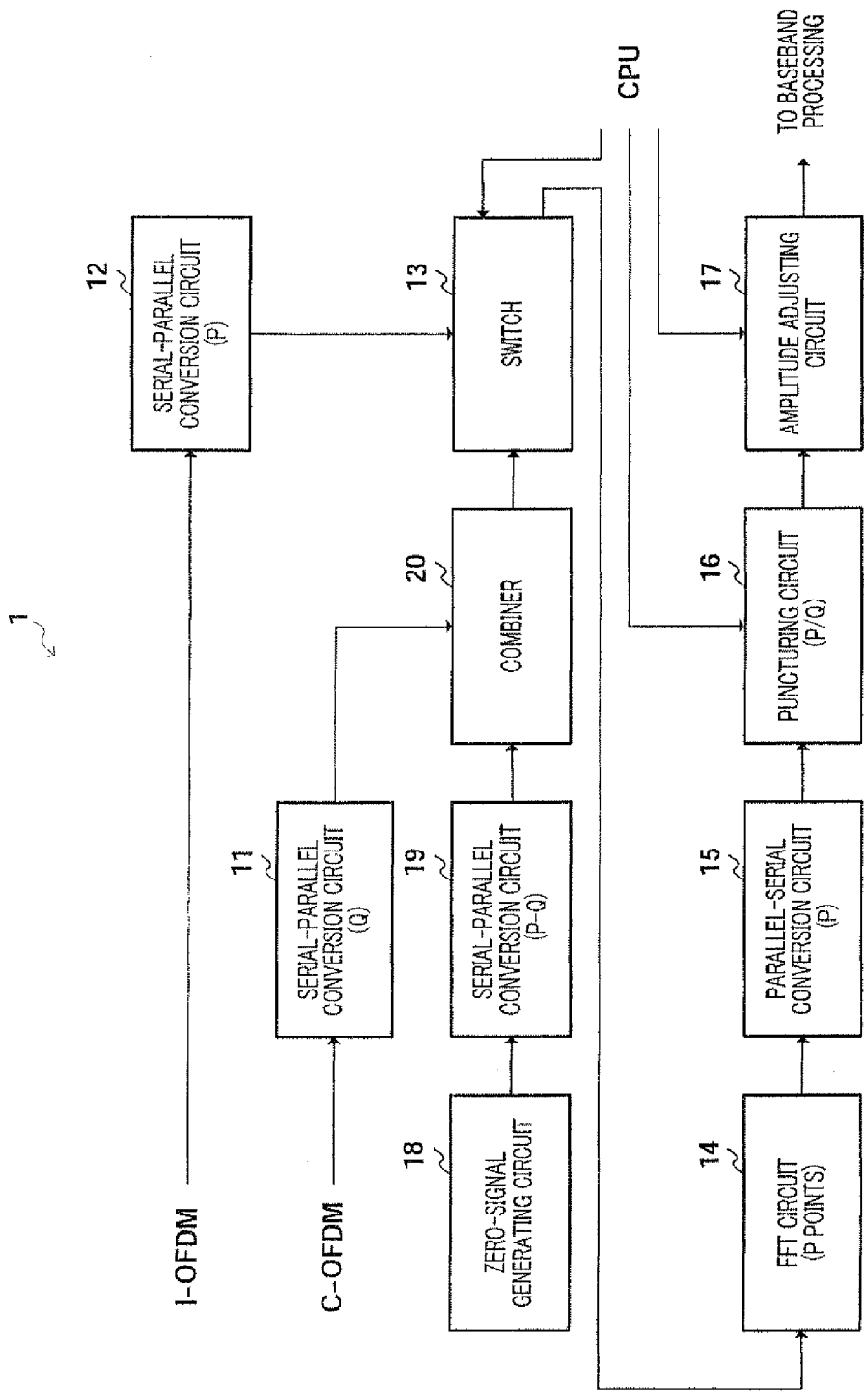
FIG. 1 is a block diagram showing an example of a conventional multimode FFT circuit.
Figure 2:
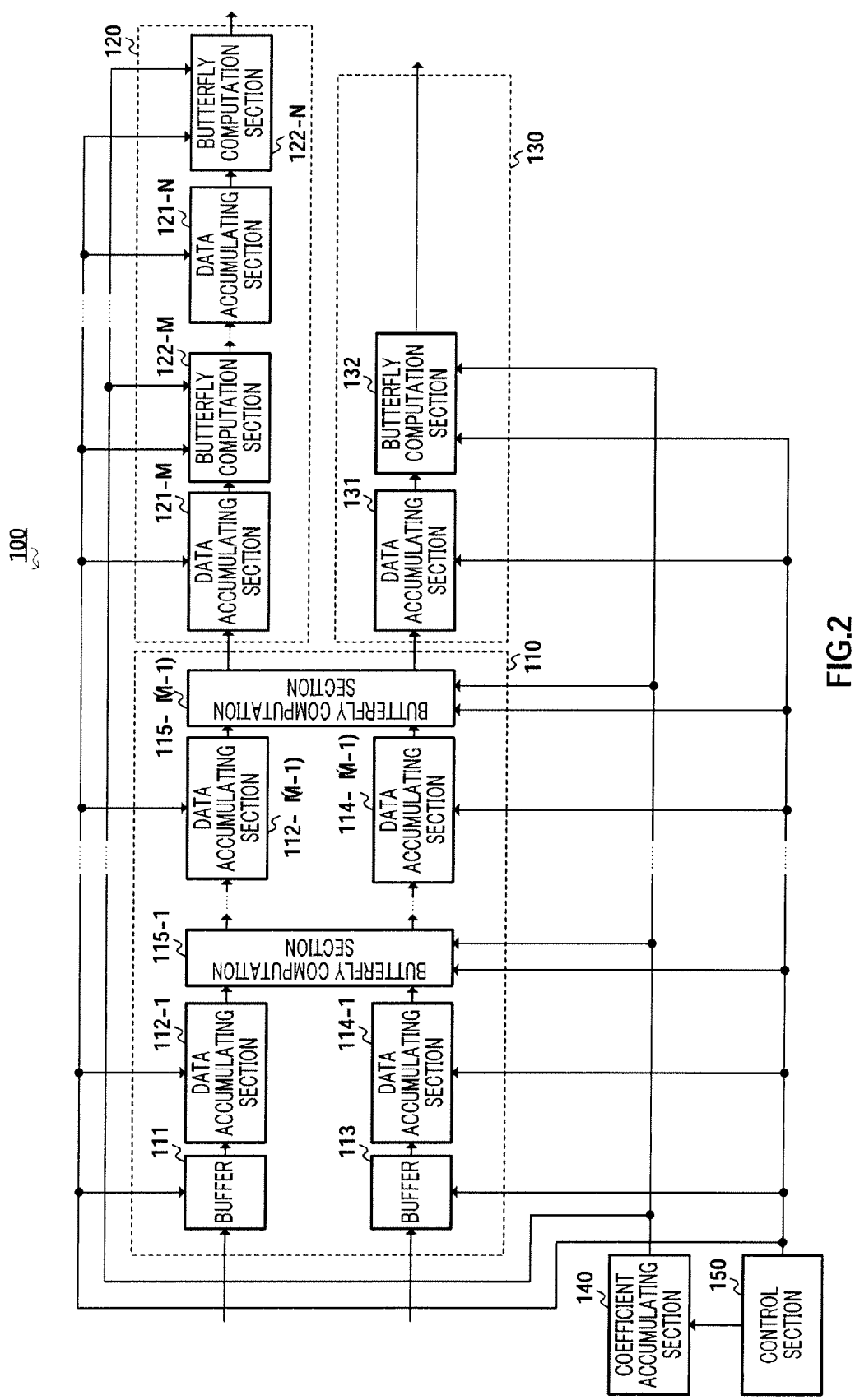
FIG. 2 is a block diagram showing a configuration of the FFT circuit according to Embodiment 1 of the present invention.

FIG. 2 is a block diagram showing a configuration of the FFT circuit according to Embodiment 1 of the present invention.

Fast Fourier transform circuit (hereinafter "FFT circuit") 100 shown in FIG. 2 is a multimode FFT circuit that supports a plurality of communication schemes. A case will be explained below where a communication scheme requiring FFT processing for $2^N$ points (N is a natural number) and a communication scheme requiring FFT processing for $2^M$ points (M is a natural number and equal to or less than N) are processed at the same time. Here, butterfly computation with a base 2 needs to be performed in N steps to perform FFT processing for $2^N$ points, and butterfly computation with a base 2 needs to be performed in M steps to perform FFT processing for $2^M$ points.

FFT circuit 100 shown in FIG. 2 employs a configuration having first FFT processing section 110, second FFT processing section 120, third FFT processing section 130, coefficient accumulating section 140 and control section 150.

First FFT processing section 110 is formed with first buffer 111, (M−1) data accumulating sections 112-1 to 112-(M−1) from the (1-1)-th to the (1-(M−1))-th, second buffer 113, (M−1) data accumulating sections 114-1 to 114-(M−1) from the (2-1)-th to the (2-(M−1))-th, and (M−1) butterfly computation sections 115-1 to 115-(M−1) from the first to the (M−1)-th. By this means, first FFT processing section 110 performs FFT processing of (M−1) steps (i.e., from the first step to the (M−1)-th step) on a digital signal inputted to first buffer 111 and second buffer 113.

Second FFT processing section 120 is formed with (N−M+1) data accumulating sections 121-M to 121-N from the (1-M)-th to the (1-N)-th, and (N−M+1) butterfly computation sections 122-M to 122-N from the M-th to the N-th. By this means, second FFT processing section 120 performs FFT processing of (N−M+1) steps (i.e., from the M-th step to the N-th step) on the digital signal that is inputted to first buffer 111 and subjected to FFT processing in first FFT processing section 110.

Third FFT processing section 130 is formed with (2-M)-th data accumulating section 131 and (2-M)-th butterfly computation section 132. By this means, third FFT processing section 130 performs FFT processing of one step (i.e., of the M-th step) on the digital signal that is inputted to second buffer 113 and subjected to FFT processing in first FFT processing section 110.

Figure 3:
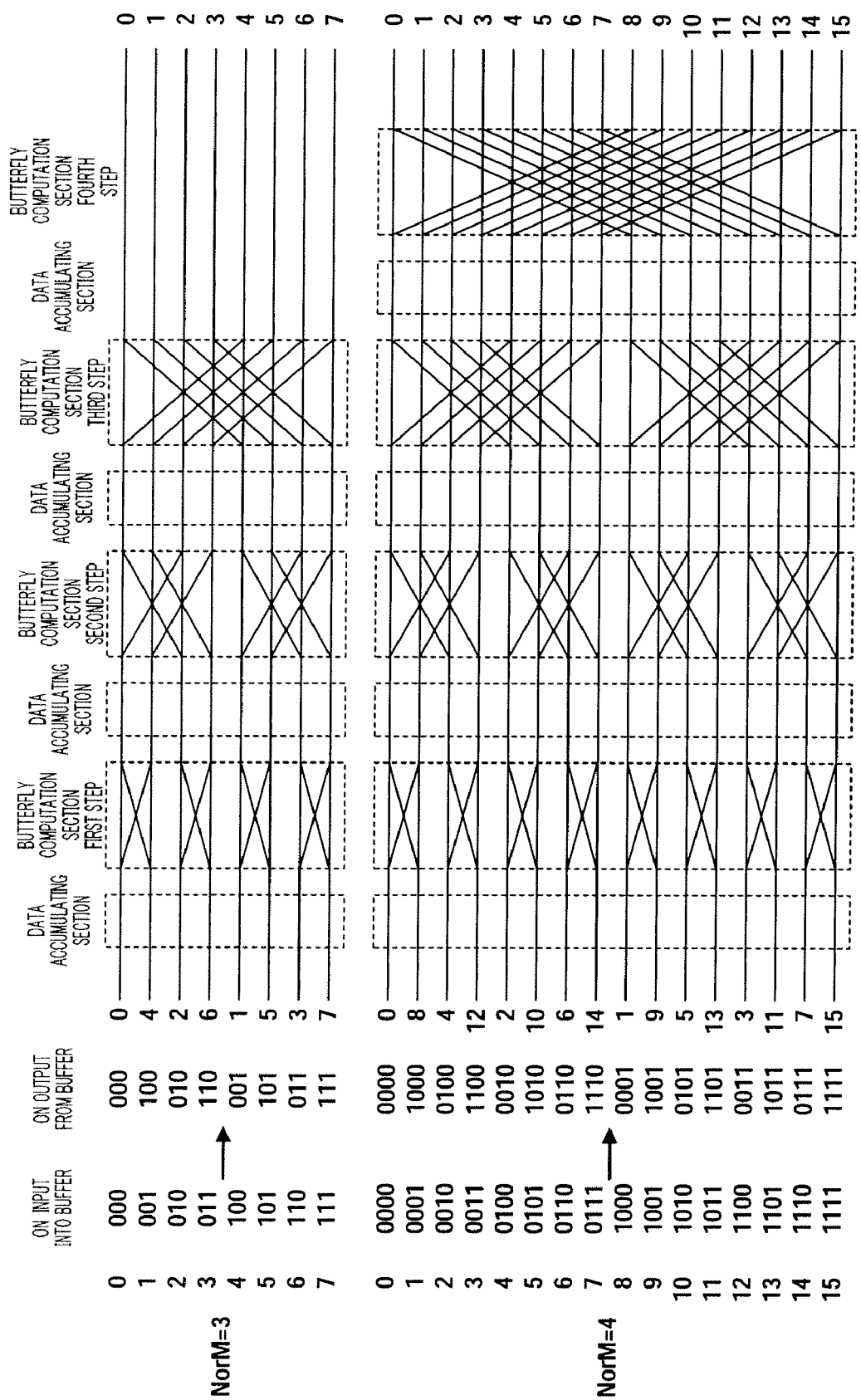
FIG. 3 shows a state of a digital signal rearrangement and butterfly computation in Embodiment 1.

First buffer 111 accumulates $2^N$ digital signals and outputs the accumulated digital signals to (1-1)-th data accumulating section 112-1 under control of control section 150. In this case, the digital signals inputted to first buffer 111 are rearranged into the position of a bit reversed order where the order of bits is reversed, and are outputted. For example, as shown in FIG. 3, the arrangement of the inputted digital signal $0, 1, \ldots, 2^N-2, 2^N-1$ is rearranged into the position of a bit reversed order, that is, the bit order of the inputted digital signal is rearranged into the arrangement $0, 2^{N-1}, \ldots, 2^{N-1}-1, 2^N-1$, and outputted.

Second buffer 113 accumulates $2^M$ digital signals and outputs the accumulated digital signals to (2-1)-th data accumulating section 114-1 under control of control section 150. In this case, in the same way as in first buffer 111, the digital signals inputted to second buffer 113 are rearranged into the position of a bit reversed order where the order of bits is reversed, and outputted. For example, as shown in FIG. 3, the arrangement of bits of an inputted digital signal $0, 1, \ldots, 2^M-2, 2^M-1$ is rearranged into the position of a bit reversed order, that is, the bit order of the inputted digital signal is rearranged into the arrangement $0, 2^{M-1}, \ldots, 2^{M-1}-1, 2^M-1$, and outputted.

Further, in the present embodiment, although first buffer 111 and second buffer 113 are both included in first FFT processing section 110, the present invention is not limited thereto. First buffer 111 and second buffer 113 may be both positioned outside first FFT processing section 110. In this case, first FFT processing section is formed with (M−1) data accumulating sections 112-1 to 112-(M−1), (M−1) data accumulating sections 114-1 to 114-(M−1) and (M−1) butterfly computation sections 115-1 to 115-(M−1).

Each of (1-1)-th data accumulating section 112-1 and (2-1)-th data accumulating section 114-1 accumulates $2^{M-1}$ digital signals. When (1-1)-th data accumulating section 112-1 or (2-1)-th data accumulating section 114-1 accumulates $2^{M-1}$ digital signals, first butterfly computation section 115-1 performs butterfly computation with a base 2 of the first step with respect to the accumulated $2^{M-1}$ digital signals. Here, the result of butterfly computation with respect to the digital signals accumulated in (1-1)-th data accumulating section 112-1 is outputted to (1-2)-th data accumulating section 112-2. Further, the result of butterfly computation with respect to the digital signals accumulated in (2-1)-th data accumulating section 114-1 is outputted to (2-2)-th data accumulating section 114-2.

As shown in FIG. 3, first butterfly computation section 115-1 performs a butterfly computation with a base 2 of the first step between respective pairs of the first digital signal and the second digital signal, the third digital signal and the fourth digital signal, $\ldots$, the $(2^{M-1}-1)$-th digital signal and the $2^{M-1}$-th digital signal, among $2^{M-1}$ digital signals accumulated in (1-1)-th data accumulating section 112-1 or (2-1)-th data accumulating section 114-1, using coefficients inputted from coefficient accumulating section 140.

If a digital signal accumulated in (1-1)-th data accumulating section 112-1 is $f_1(1,n)$ and an inputted coefficient is $W_1(1,n)$, a digital signal to be outputted is expressed by following equations 1 and 2.

[1]
$$f_1(2,n)=f_1(1,n)+W_1(1,n)\times f_1(1,n+1) \quad \text{(Equation 1)}$$

[2]
$$f_1(2,n+1)=f_1(1,n)-W_1(1,n)\times f_1(1,n+1) \quad \text{(Equation 2)}$$

Further, if a digital signal accumulated in (2-1)-th data accumulating section 114-1 is $f_2(1,n)$ and an inputted coefficient is $W_2(1,n)$, a digital signal to be outputted is expressed by following equations 3 and 4.

[3]
$$f_2(2,n)=f_2(1,n)+W_2(1,n)\times f_2(1,n+1) \quad \text{(Equation 3)}$$

[4]
$$f_2(2,n+1)=f_2(1,n)-W_2(1,n)\times f_2(1,n+1) \quad \text{(Equation 4)}$$

Here, coefficient $W_1(1,n)$ is expressed by following equation 5.

[5]
$$W_1(1,n)=\exp(-j2\pi k_1(1,n)-2^N) \quad \text{(Equation 5)}$$

Further, coefficient $W_2(1,n)$ is expressed by following equation 6.

[6]
$$W_2(1,n)=\exp(-j2\pi k_2(1,n)/2^M) \quad \text{(Equation 6)}$$

Here, $k_1(1,n)=0$ or $2^{N-1}$, and $k_2(1,n)=0$ or $2^{M-1}$. Consequently, with equations 5 and 6, the relationship $W_1(1,n)=W_2(1,n)=1$ or $-1$ holds.

That is, coefficients used in first butterfly computation section 115-1 are shared between digital signals accumulated in (1-1)-th data accumulating section 112-1 and digital signals accumulated in (2-1)-th data accumulating section 114-1.

Figure 4:
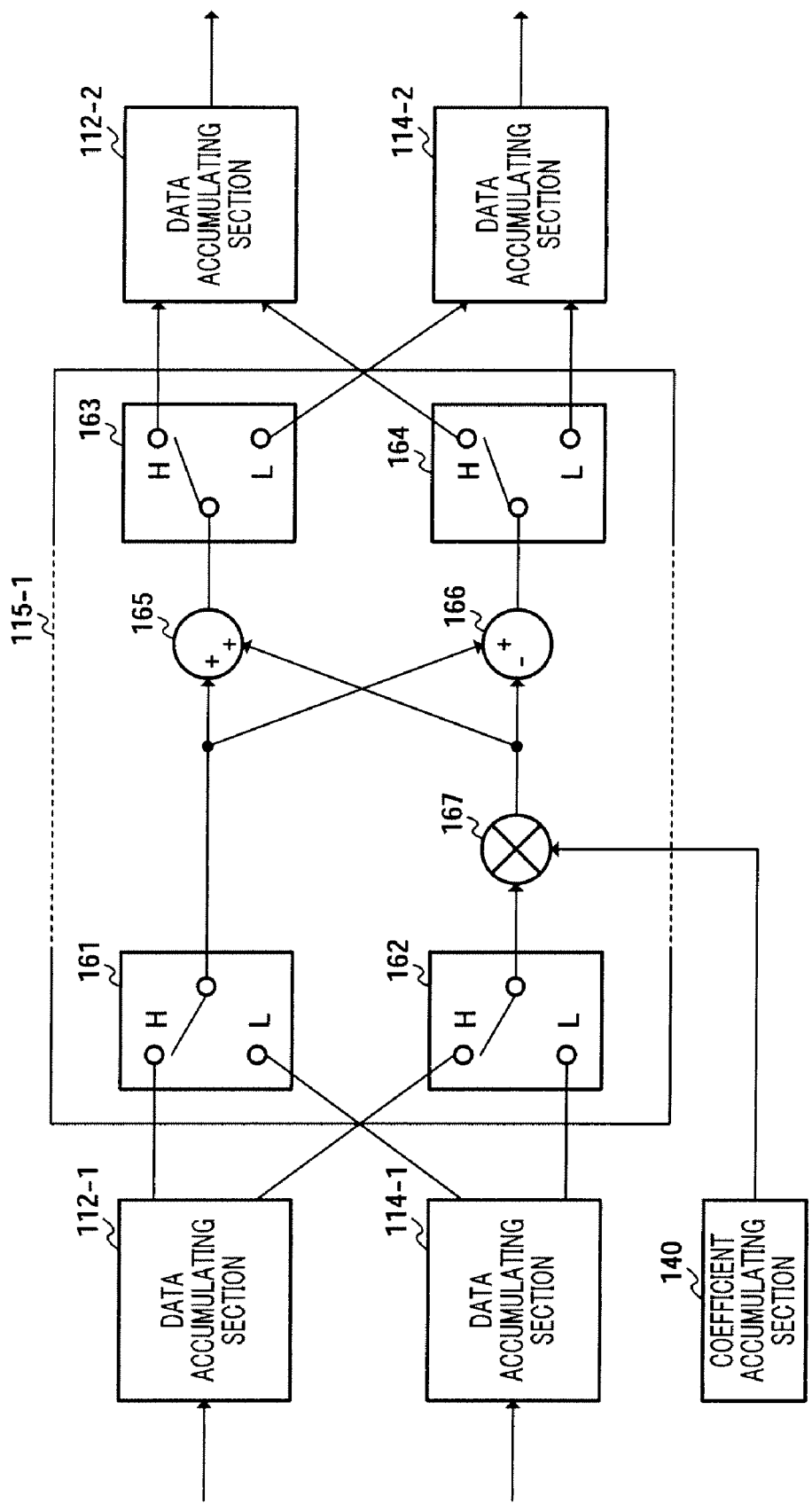
FIG. 4 is a block diagram showing a configuration of the butterfly computation section in Embodiment 1.

FIG. 4 is a block diagram showing the configuration of first butterfly computation section 115-1 that performs a butterfly computation with a base 2.

First butterfly computation section 115-1 includes four switches 161, 162, 163 and 164, adder 165, subtractor 166 and multiplier 167. As shown in FIG. 2, first butterfly computation section 115-1 is controlled by control section 150. Switches 161 to 164 are each controlled to the position of H or L by control section 150. If switches 161 to 164 are each set to the position of H, as a result of butterfly computation with respect to digital signals accumulated in (1-1)-th data accumulating section 112-1, a digital signal expressed by equation 1 is outputted from switch 163 and a digital signal expressed by equation 2 is outputted from switch 164. By contrast, if switches 161 to 164 are each set to the position of L, as a result of butterfly computation with respect to digital signals accumulated in (2-1)-th data accumulating section 114-1, a digital signal expressed by equation 3 is outputted from switch 163 and a digital signal expressed by equation 4 is outputted from switch 164.

After that, accumulating digital signals in data accumulating sections and performing a butterfly computation with respect to the accumulated digital signals, are repeated. Further, as shown in FIG. 3, (M−1)-th butterfly computation section 115-(M−1) performs a butterfly computation with a base 2 of the (M−1)-th step with respect to $2^{M-1}$ digital signals accumulated in (1-(M−1))-th data accumulating section 112-(M−1) or (2-(M−1))-th data accumulating section 114-(M−1), using coefficients inputted from coefficient accumulating section 140.

If a digital signal accumulated in (1-(M−1))-th data accumulating section 112-(M−1) is $f_1(M-1,n)$ and an inputted coefficient is $W_1(M-1,n)$, a digital signal to be outputted is expressed by following equations 7 and 8.

[7]
$$f_1(M,n)=f_1(M-1,n)+W_1(M-1,n)\times f_1(M-1,n+2^{M-2}) \quad \text{(Equation 7)}$$

[8]
$$f_1(M,n+2^{M-2})=f_1(M-1,n)-W_1(M-1,n)\times f_1(M-1,n+2^{M-2}) \quad \text{(Equation 8)}$$

If a digital signal accumulated in (2-(M−1))-th data accumulating section 114-(M−1) is $f_2(M-1,n)$ and an inputted coefficient is $W_2(M-1,n)$, a digital signal to be outputted is expressed by following equations 9 and 10.

[9]
$$f_2(M,n)=f_2(M-1,n)+W_2(M-1,n)\times f_2(M-1,n+2^{M-2}) \quad \text{(Equation 9)}$$

[10]
$$f_2(M,n+2^{M-2})=f_2(M-1,n)-W_2(M-1,n)\times f_2(M-1,n+2^{M-2}) \quad \text{(Equation 10)}$$

Here, coefficient $W_1(M-1,n)$ is expressed by following equation 11.

[11]
$$W_1(M-1,n)=\exp(-j2\pi k_1(M-1,n)/2^N) \quad \text{(Equation 11)}$$

Further, coefficient $W_2(M-1,n)$ is expressed by following equation 12.

[12]
$$W_2(M-1,n)=\exp(-j2\pi k_2(M-1,n)/2^M) \quad \text{(Equation 12)}$$

Here, $k_1(M-1,n)=2^{N-(M-1)}\times(0, 1, \ldots, 2^{M-1}-2, 2^{M-1}-1)$, and $k_2(M-1,n)=2^{M-(M-1)}\times(0, 1, \ldots, 2^{M-1}-2, 2^{M-1}-1)$. Consequently, with equations 11 and 12, the relationship $W_1(M-1,n)=W_2(M-1,n)=\exp(-j2\pi/2^{M-1}\times(0, 1, \ldots, 2^{M-1}-2, 2^{M-1}-1))$ holds.

That is, coefficients used in (M−1)-th butterfly computation section 115-(M−1) are shared between digital signals accumulated in (1-(M−1))-th data accumulating section 112-(M−1) and digital signals accumulated in (2-(M−1))-th data accumulating section 114-(M−1).

A result of butterfly computation for digital signals accumulated in (1-(M−1))-th data accumulating section 112-(M−1) is outputted to (1-M)-th data accumulating section 121-M in second FFT processing section 120. Further, a result of butterfly computation for digital signals accumulated in (2-(M−1))-th data accumulating section 114-(M−1) is outputted to (2-M)-th data accumulating section 131 in third FFT processing section 130.

(1-M)-th data accumulating section 121-M accumulates $2^N$ digital signals. When (1-M)-th data accumulating section 121-M accumulates an input of $2^{M-1}$ digital signals from (M−1)-th butterfly computation section 115-(M−1) $2^{N-M+1}$ times (i.e., $2^N$ digital signals), M-th butterfly computation section 122-M performs a butterfly computation with a base 2 of the M-th step with respect to the accumulated $2^N$ digital signals, using coefficients inputted from coefficient accumulating section 140.

After that, accumulating digital signals in data accumulating sections and performing a butterfly computation with respect to the accumulated digital signals, are repeated. In the N-th step, N-th butterfly computation section 122-N performs a butterfly computation with a base 2 of the N-th step with respect to $2^N$ digital signals accumulated in (1-N)-th data accumulating section 121-N, using coefficients inputted from coefficient accumulating section 140.

If a digital signal accumulated in (1-N)-th data accumulating section 121-N is $f_1(N,n)$ and an inputted coefficient is $W_1(N,n)$, the digital signal to be outputted is expressed by following equations 13 and 14. Further, this digital signal is outputted from FFT circuit 100 as the final result of FFT processing with respect to the digital signal inputted to first buffer 111.

[13]
$$f_1(N+1,n)=f_1(N,n)+W_1(N,n)\times f_1(N,n+2^{N-1}) \quad \text{(Equation 13)}$$

[14]
$$f_1(N+1,n+2^{N-1})=f_1(N,n)-W_1(N,n)\times f_1(N,n+2^{N-1}) \quad \text{(Equation 14)}$$

In this case, coefficient $W_1(N,n)$ is expressed by following equation 15.

[15]
$$W_1(N,n)=\exp(-j2\pi k_1(N,n)/2^N) \quad \text{(Equation 15)}$$

Here, $k_1(N,n)=2^{N-N}\times(0, 1, \ldots, 2^N-2, 2^N-1)$ and, consequently, equation 15 is expressed by following equation 16.

[16]
$$W_1(N,n)=\exp(-j2\pi/2^N\times(0, 1, \ldots, 2^N-2, 2^N-1)) \quad \text{(Equation 16)}$$

On the other hand, (2-M)-th data accumulating section 131 accumulates $2^M$ digital signals. When (2-M)-th data accumulating section 131 accumulates an input of $2^{M-1}$ digital signals from (M-1)-th butterfly computation section 115-(M-1) twice (i.e., $2^M$ digital signals), butterfly computation section 132 performs a butterfly computation with a base 2 of the M-th step with respect to the accumulated $2^M$ digital signals, using coefficients inputted from coefficient accumulating section 140.

If a digital signal accumulated in (2-M)-th data accumulating section 131 is $f_2(M,n)$ and an inputted coefficient is $W_2(M,n)$, a digital signal to be outputted is expressed by following equations 17 and 18. Further, this digital signal is outputted to FFT circuit 100 as the final result of FFT processing with respect to the digital signal inputted to second buffer 113.

[17]
$$f_2(M+1,n)=f_2(M,n)+W_2(M,n)\times f_2(M,n+2^{M-1}) \quad \text{(Equation 17)}$$

[18]
$$f_2(M+1,n+2^{M-1})=f_2(M,n)-W_2(M,n)\times f_2(M,n+2^{M-1}) \quad \text{(Equation 18)}$$

Here, coefficient $W_2(M,n)$ is expressed by following equation 19.

[19]
$$W_2(M,n)=\exp(-j2\pi k_2(M,n)/2^M) \quad \text{(Equation 19)}$$

Here, according to equation 19, $k_2(M,n)=2^{M-M}\times(0, 1, \ldots, 2^M-2, 2^M-1)$, and, consequently, equation 19 is expressed by following equation 20.

[20]
$$W_2(M,n)=\exp(-j2\pi/2^M\times(0, 1, \ldots, 2^M-2, 2^M-1)) \quad \text{(Equation 20)}$$

As described above, according to the present embodiment, by providing buffers with a plurality of communication schemes (including a communication scheme requiring FFT processing for $2^N$-points and a communication scheme requiring FFT processing for $2^M$-points) and rearranging the order of accumulated digital signals, it is possible to share part of butterfly computation sections 115-1 to 115-(M-1). By this means, it is possible to support a plurality of communication schemes and optimize resources for computation. Further, in shared butterfly computation sections 115-1 to 115-(M-1), coefficients for use can be shared, so that it is possible to further optimize resources for computation.

Further, although a case has been described as an example with the present embodiment where butterfly computation with a base 2 is used, the base for butterfly computation is not limited to 2. By performing a butterfly computation using different bases such as a base 4 and a base of 8 instead of a base 2, it is possible to employ a configuration that reduces the number of steps in butterfly computation.

Further, the configuration according to the present embodiment can be changed into other configurations. Some example of variation will be explained below.

Figure 5:
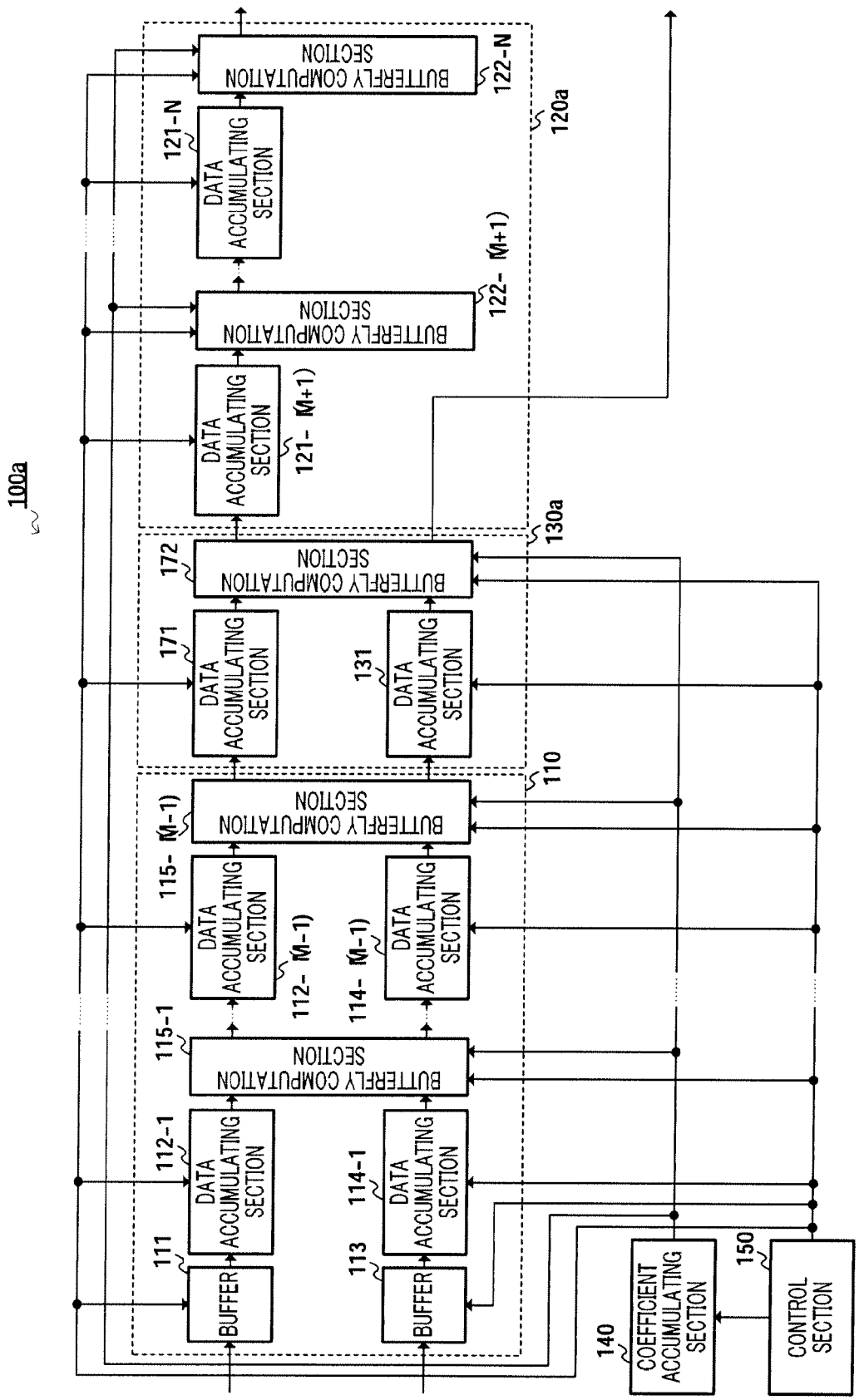
FIG. 5 is a block diagram showing an example of variation of Embodiment 1.

FIG. 5 is a block diagram showing an example of variation of the present embodiment.

This example shows a case of sharing the M-th butterfly computation section. That is, FFT circuit 100a shown in FIG. 5 includes second FFT processing section 120a and third FFT processing section 130a. Second FFT processing section 120a employs a configuration obtained by removing (1-M)-th data accumulating section 121-M and M-th butterfly computation section 122-M from second FFT processing section 120 in Embodiment 1 shown in FIG. 2. Further, third FFT processing section 130a employs a configuration obtained by removing butterfly computation section 132 from third FFT processing section 130 in Embodiment 1 shown in FIG. 2 and adding (1-M)-th data accumulating section 171 and M-th butterfly computation section 172.

In this case, (1-M)-th data accumulating section 171 accumulates $2^M$ digital signals and M-th butterfly computation section 172 can be shared between digital signals accumulated in (1-M)-th data accumulating section 171 and digital signals accumulated in (2-M)-th data accumulating section 131.

A result of butterfly computation of the digital signals accumulated in (1-M)-th data accumulating section 171 is outputted to (1-(M+1)) data accumulating section 121-(M+1) in second FFT processing section 120a. Further, the result of butterfly computation of the digital signals accumulated in (2-M)-th data accumulating section 131 is outputted from FFT circuit 10a.

Figure 6:
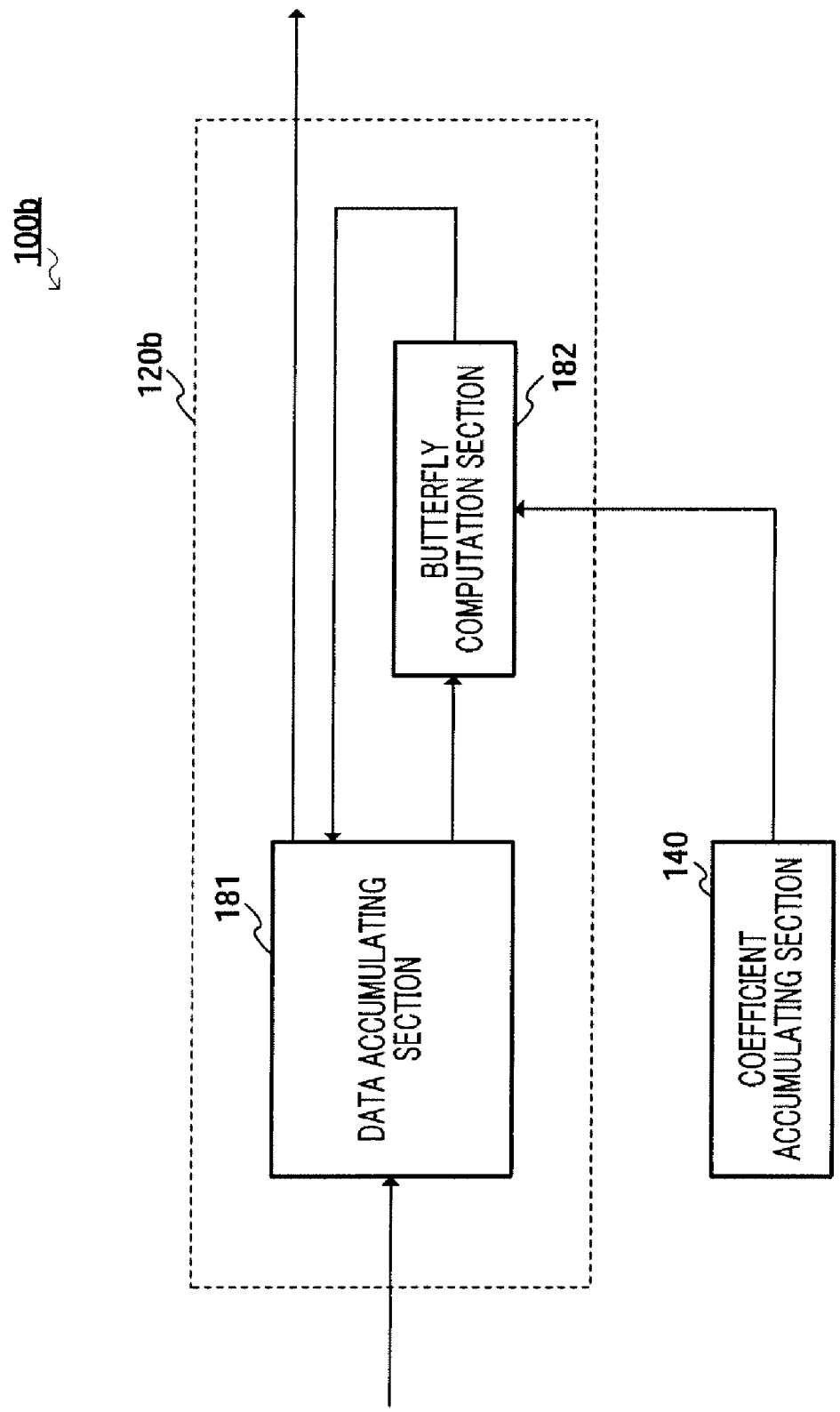
FIG. 6 is a block diagram showing another example of variation of Embodiment 1.

FIG. 6 is a block diagram showing another example of variation of the present embodiment.

Although second FFT processing section 120 in FFT circuit 100 shown in FIG. 2 and second FFT processing section 120a in FFT circuit 100a shown in FIG. 5 perform pipelined FFT processing, this example shows a case of performing memory-based FFT processing. That is, FFT circuit 100b shown in FIG. 6 includes one data accumulating section 181 and one butterfly computation section 182. Thus, FFT circuit 100b shown in FIG. 6 is different from FFT circuit 100 shown in FIG. 2 and FFT circuit 10a shown in FIG. 5 in having only one data accumulating section 181 and one butterfly computation section 182.

Data accumulating section 181 in FFT circuit 100b (second FFT processing section 120b) shown in FIG. 6 accumulates $2^N$ digital signals. For example, if the configuration of FIG. 6 is applied to the configuration of FIG. 2, when data accumulating section 181 accumulates an input of $2^{M-1}$ digital signals from (M-1)-th butterfly computation section 115-(M-1) $2^{N-M+1}$ times (i.e., $2^N$ digital signals), butterfly computation section 182 performs a butterfly computation with a base 2 of the M-th step with respect to $2^N$ accumulated digital signals, using coefficients inputted form coefficient accumulating section 140. This result of butterfly computation is written over data in data accumulating section 181 every time the butterfly computation is performed. After that, overwriting data in data accumulating section 181 and performing a butterfly computation with respect to the overwritten digital signals are repeated. Then if butterfly computation with a base 2 of the N-th step is performed, digital signals to be outputted from data accumulating section 181 is outputted from FFT processing section 100b as a result of FFT processing on digital signals inputted to first buffer 111. Further, if the configuration of FIG. 6 is applied to the configuration of FIG. 5, butterfly computation with a base 2 is performed from the (M+1)-th step.

According to this example of variation, compared to the pipelined configurations shown in FIG. 2 and FIG. 5, second FFT processing section 120b needs not to be provided with a plurality of data accumulating sections and a plurality of butterfly computing sections, but needs to be provided with merely one data accumulating section 181 and one butterfly computation section 182, so that it is possible to miniaturize FFT circuits.

Figure 7:
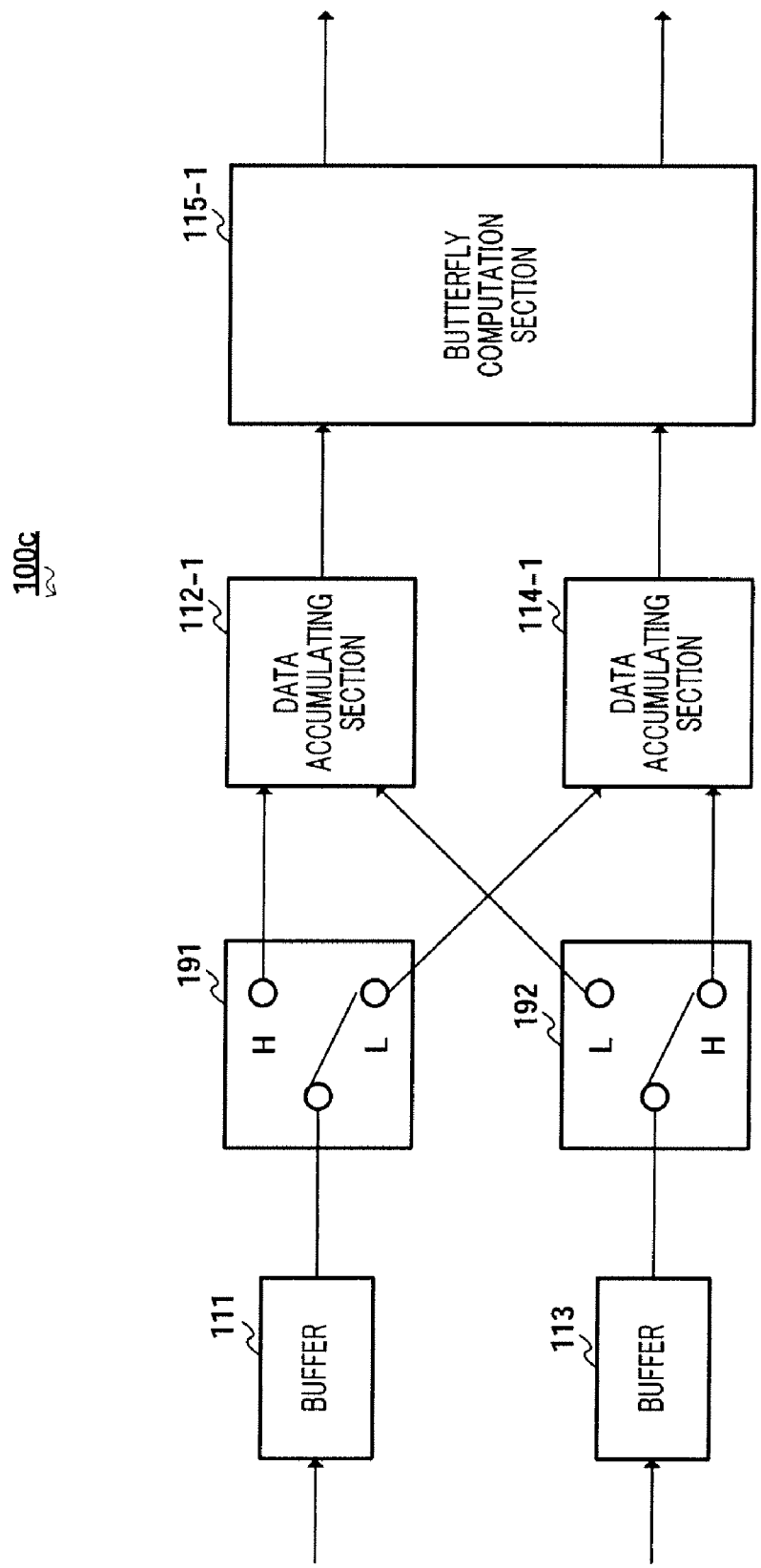
FIG. 7 is a block diagram showing a further example of variation of Embodiment 1.

FIG. 7 is a block diagram showing a further example of variation of the present embodiment.

This example shows a case where a first FFT processing section has a switch. That is, in FFT circuit 100c shown in FIG. 7, the first FFT processing section (e.g., first FFT processing section 110 shown in FIG. 2) further includes two switches 191 and 192. In this case, for example, if communication is not performed by one of two communication schemes, changing switch 191 enables (1-1)-th data accumulating section 112-1 and (2-1)-th data accumulating section 114-1 each to accumulate $2^{M-1}$ digital signals from first buffer 111. Consequently, the combination of (1-1)-th data accumulating section 112-1 and (2-1)-th data accumulating section 114-1 can be regarded as one data accumulating section that accumulates $2^M$ digital signals, so that it is possible to perform FFT processing faster.

In other words, if merely one sequence of FFT processing needs to be performed, the first FFT processing section performs butterfly computation processing every $2^M$ digital signals in (M−1) steps. That is, a double data area can be assigned for the butterfly computation in the first FFT processing, so that it is possible to make computation in a FFT circuit faster.

(Embodiment 2)

Figure 8:
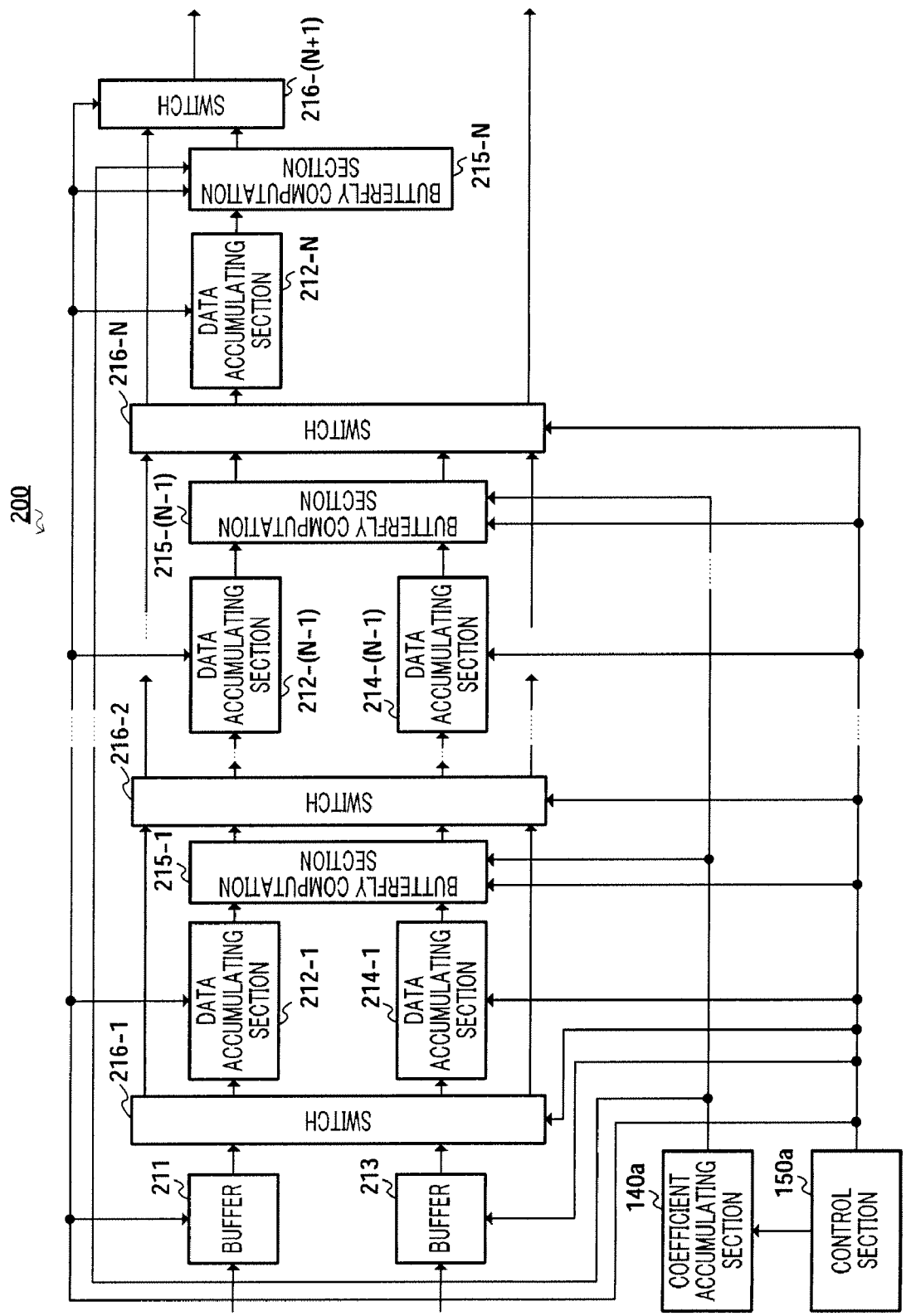
FIG. 8 is a block diagram showing a configuration of the FFT circuit according to Embodiment 2 of the present invention.

FIG. 8 is a block diagram showing the configuration of the FFT circuit according to Embodiment 2 of the present invention. Here, FFT circuit 200 shown in FIG. 8 has the same basic configuration as in FFT circuit 100 shown in FIG. 2 and detailed explanations thereof will be omitted.

Features of the present embodiment include a configuration that performs FFT processing for arbitrary points using maximum $2^N$ points and $2^{N-1}$ points.

Therefore, FFT circuit 200 shown in FIG. 8 employs a configuration having first buffer 211, N data accumulating sections 212-1 to 212-N from the (1-1)-th to the (1-N)-th, second buffer 213, (N−1) data accumulating sections 214-1 to 214-(N−1) from the (2-1)-th to the (2-(N−1))-th, N butterfly computation sections 215-1 to 215-N from the first to the N-th, (N+1) switches 216-1 to 216-(N+1) from the first to the (N+1)-th, coefficient accumulating section 140a and control section 150a.

First buffer 211 accumulates maximum $2^N$ digital signals and outputs the accumulated digital signals to first switch 216-1 under control of control section 150a. Here, similar to first buffer 111 in Embodiment 1, as shown in FIG. 3, the arrangement of bits of an inputted digital signal 0, 1, . . . , $2^N-2$, $2^N-1$ is rearranged into the position of a bit reversed order, that is, the bit order of the inputted digital signal is rearranged into the arrangement 0, $2^{N-1}$, . . . , $2^{N-1}-1$, $2^N-1$, and outputted.

Second buffer 213 accumulates maximum $2^{N-1}$ digital signals and outputs the accumulated digital signals to first switch 216-1 under control of control section 150a. Here, similar to second buffer 113 in Embodiment 1, as shown in FIG. 3, the arrangement of bits of an inputted digital signal 0, 1, . . . , $2^{N-1}-2$, $2^{N-1}-1$ is rearranged into the position of a bit reversed order, that is, the bit order of the inputted digital signal is rearranged into the arrangement 0, $2^{N-2}$, . . . , $2^{N-2}-1$, $2^{N-1}-1$, and outputted.

Figure 9:
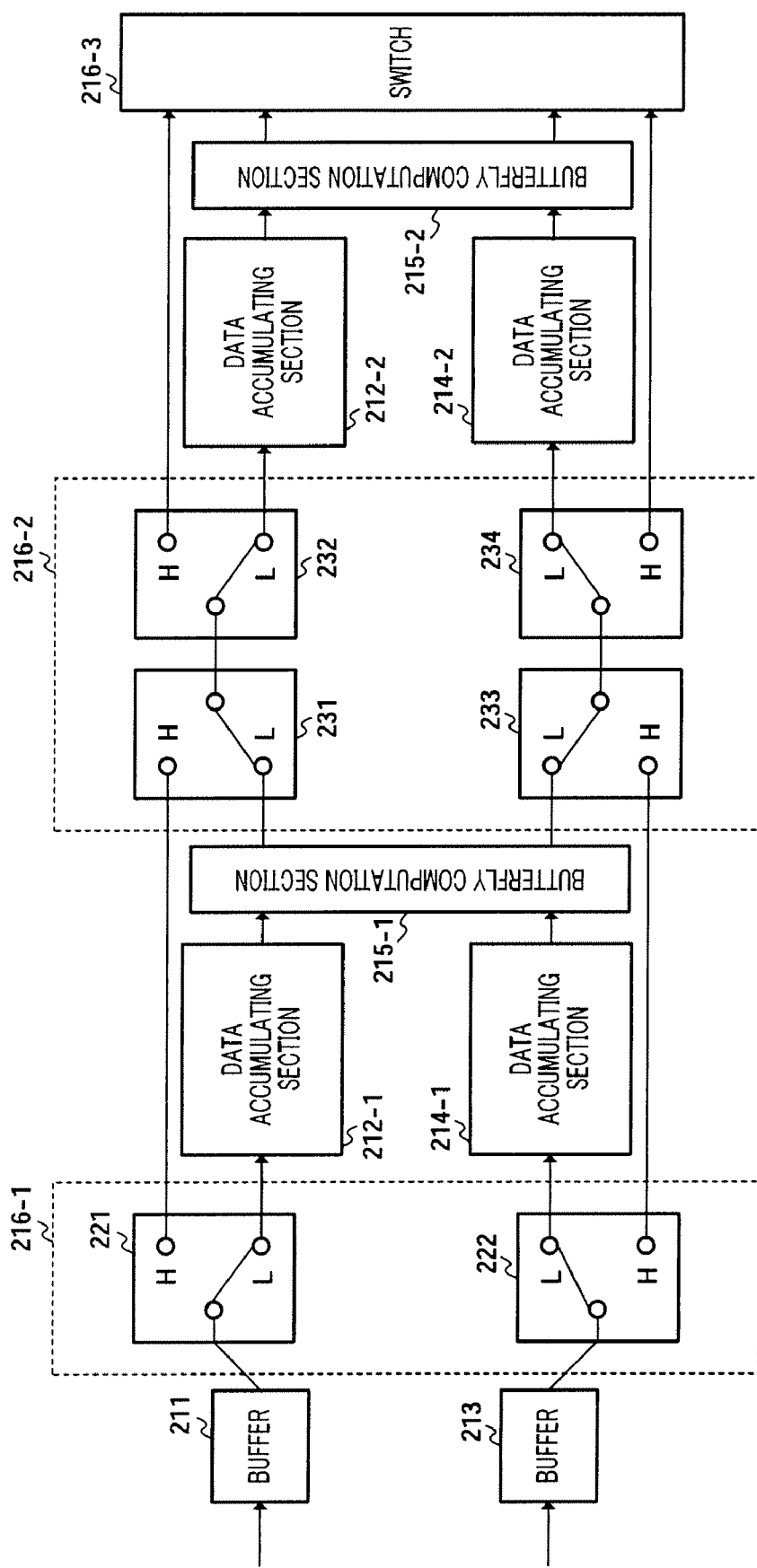
FIG. 9 is a block diagram showing a configuration of the switch in Embodiment 2.

As shown in FIG. 9, first switch 216-1 has two switches 221 and 222, and is controlled by control section 150a. That is, switches 221 and 222 are each controlled to the position of H or L by control section 150a. When the position of switch 221 is L, an input signal from first buffer 211 is outputted to (1-1)-th data accumulating section 212-1, and, when the position of switch 221 is H, the input signal from first buffer 211 is outputted to second switch 216-2. Further, when the position of switch 222 is H, an input signal from second buffer 213 is outputted to (2-1)-th data accumulating section 214-1, and, when the position of switch 222 is L, the input signal from second buffer 213 is outputted to second switch 216-2.

Each of (1-1)-th to (1-N)-th data accumulating sections 212-1 to 212-N accumulates $2^1$ to $2^N$ digital data. When (1-1)-th to (1-N)-th data accumulating sections 212-1 to 212-N have accumulated $2^1$ to $2^N$ digital signals, first to the N-th butterfly computation sections 215-1 to 215-N perform respective butterfly computations with a base 2 of the first to N-th steps with respect to $2^1$ to $2^N$ accumulated digital signals, using coefficients inputted from coefficient accumulating section 140a.

Each of (2-1)-th to (2-(N−1))-th data accumulating sections 214-1 to 214-(N−1) accumulates $2^1$ to $2^{N-1}$ digital data. When (2-1)-th to (2-(N−1))-th data accumulating sections 214-1 to 214-(N−1) accumulate $2^1$ to $2^{N-1}$ digital signals, first to (N−1)-th butterfly computation sections 215-1 to 215-(N−1) perform respective butterfly computations with a base 2 of the first to (N−1)-th steps with respect to $2^1$ to $2N−1$ accumulated digital signals, using coefficients inputted from coefficient accumulating section 140a.

Similar to the butterfly computation section according to Embodiment 1, as shown in FIG. 3 and FIG. 4, first to N-th butterfly computation sections 215-1 to 215-N perform respective butterfly computations with a base 2 of the first to N-th steps with respect to $2^1$ to $2^N$ digital signals accumulated in (2-1)-th to (2-(N−1))-th data accumulating sections 214-1 to 214-(N−1), using coefficients inputted from coefficient accumulating section 140a.

Second to (N−1)-th switches 216-2 to 216-(N−1) have four switches. Here, second switch 216-2 will be explained below as an example. As shown in FIG. 9, second switch 216-2 includes four switches 231, 232, 233 and 234, and is controlled by control section 150a. That is, switches 231 to 234 are each controlled to the position of H or L by control section 150a.

To be more specific, when the position of switch 231 is L, a result of butterfly computation of the first step in first butterfly computation section 215-1 with respect to the digital signals accumulated in (1-1)-th data accumulating section 212-1, is outputted to (1-2)-th data accumulating section 212-2 if the position of switch 232 is L, and outputted to third switch 216-3 if the position of switch 232 is H.

Further, when the position of switch 233 is L, a result of butterfly computation of the first step in first butterfly computation section 215-1 with respect to the digital signals accumulated in (2-1)-th data accumulating section 214-1, is outputted to (2-2)-th data accumulating section 214-2 if the position of switch 234 is L, and outputted to third switch 216-3 if the position of switch 234 is H.

Further, when the position of switch 231 is H, an input signal from first switch 216-1 is outputted to (1-2)-th data accumulating section 212-2 if the position of switch 232 is L, and outputted to third switch 216-3 if the position of switch 232 is H.

Further, when the position of switch 233 is H, an input signal from first switch 216-1 is outputted to (2-2)-th data accumulating section 214-2 if the position of switch 234 is L, and outputted to third switch 216-3 if the position of switch 234 is H.

Further, the configuration and operation of third to (N−1)-th switches 216-3 to switch 216-(N−1) are the same as second switch 216-2 and detailed explanations thereof will be omitted.

Figure 10:
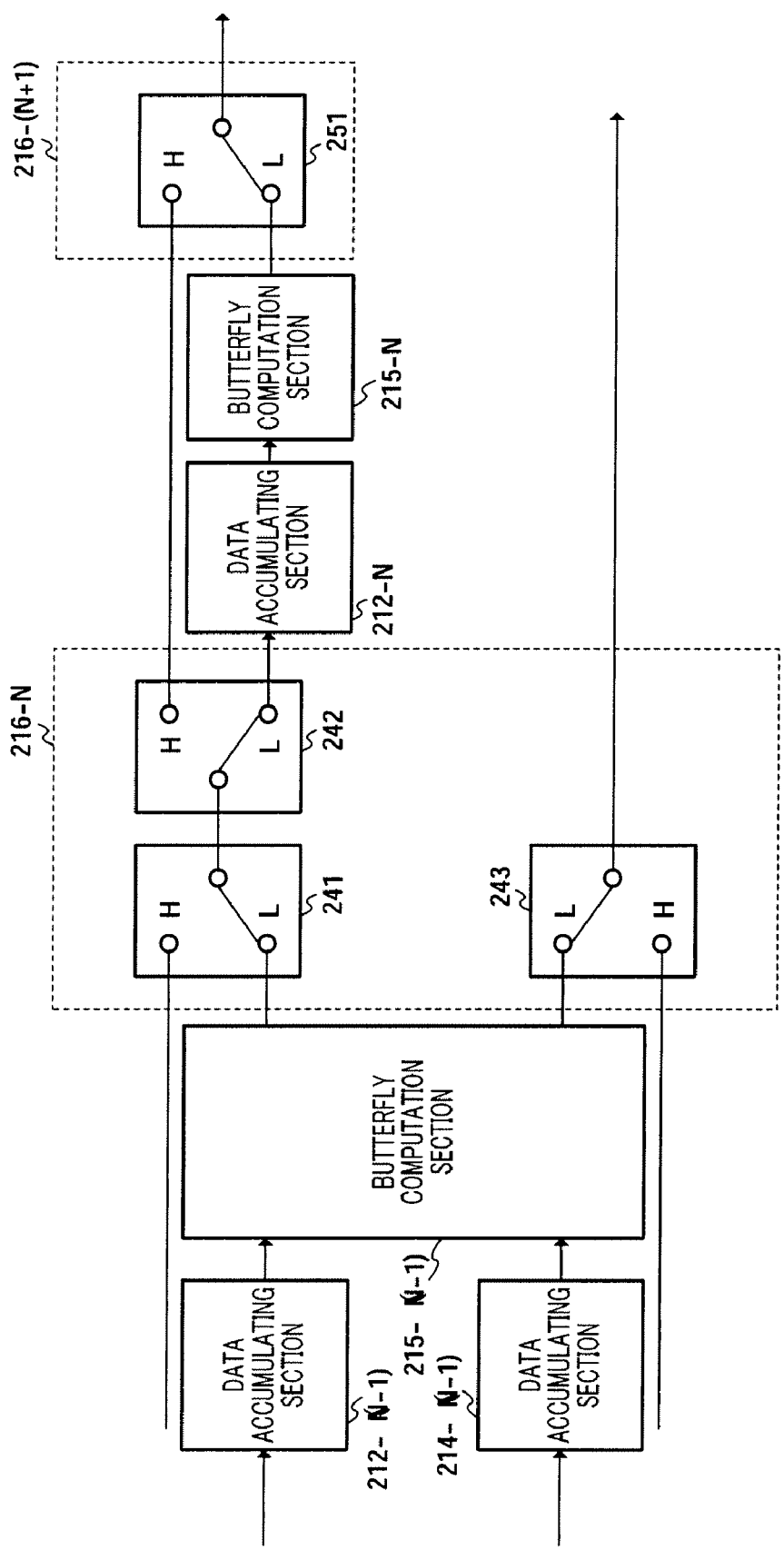
FIG. 10 is a block diagram showing a configuration of another switch in Embodiment 2.

As shown in FIG. 10, N-th switch 216-N includes three switches 241, 242 and 243, and is controlled by control section 150a. That is, switches 241 to 243 are each controlled to the position of H or L by control section 150a.

To be more specific, when the position of switch 241 is L, a result of butterfly computation of the (N−1)-th step in (N−1)-th butterfly computation section 215-(N−1) with respect to the digital signals accumulated in (1-(N−1))-th data accumulating section 212-(N−1), is outputted to (1-N)-th data accumulating section 212-N if the position of switch 242 is L, and outputted to (N+1)-th switch 216-(N+1) if the position of switch 242 is H.

Further, when the position of switch 241 is H, an input signal from (N−1)-th switch 216-(N−1) is outputted to (1-N)-th data accumulating section 212-N if the position of switch 242 is L, and outputted to (N+1)-th switch 216-(N+1) if the position of switch 242 is H.

Further, when the position of switch 243 is L, a result of butterfly computation of the (N−1)-th step in (N−1)-th butterfly computation section 215-(N−1) with respect to the digital signals accumulated in (2-(N−1))-th data accumulating section 214-(N−1), is outputted as a result of FFT processing in FFT circuit 200. Further, when the position of switch 243 is H, an input signal from (N−1)-th switch 216-(N−1) is outputted as a result of FFT processing in FFT circuit 200.

As shown in FIG. 10, (N+1)-th switch 216-(N+1) includes one switch 251, and is controlled by control section 150a. That is, switch 251 is controlled to the position of H or L by control section 150a. When the position of switch 251 is L, a result of butterfly computation of the N-th step in N-th butterfly computation section 215-N with respect to the digital signals accumulated in (1-N)-th data accumulating section 212-N, is outputted as a result of FFT processing in FFT circuit 200. Further, when the position of switch 251 is H, an input signal from N-th switch 216-N is outputted as a result of FFT processing in FFT circuit 200.

Next, a specific example of operations will be explained below in detail.

First, for example, a case will be explained where FFT processing for $2^N$-points and FFT processing for 2 N−1-points are performed.

In this case, first switch 216-1 sets two built-in switches 221 and 222 to the position of L. By this means, first switch 216-1 is controlled to (1) output an input signal from first buffer 211 to (1-1)-th data accumulating section 212-1 and (2) output an input signal from second buffer 213 to (2-1)-th data accumulating section 214-1.

Further, respective second to (N−1)-th switches 216-2 to 216-(N−1) set all four built-in switches 231 to 234 to the position of L. By this means, respective second to (N−1)-th switches 216-2 to 216-(N−1) are controlled to (1) output results of butterfly computations of the first to (N−2)-th steps in first to (N−2)-th butterfly computation sections 215-1 to 215-(N−2) with respect to the digital signals accumulated in (1-1)-th to (1-(N−2))-th data accumulating section 212-1 to 212-(N−2), to (1-2)-th to (1-(N−1))-th data accumulating sections 212-2 to 212-(N−1); and (2) output results of butterfly computations of the first to (N−2)-th steps in first to (N−2)-th butterfly computation sections 215-1 to 215-(N−2) with respect to the digital signals accumulated in (2-1)-th to (2-(N−2))-th data accumulating section 214-1 to 214-(N−2), to (2-2)-th to (2-(N−1))-th data accumulating sections 214-2 to 214-(N−1).

Further, N-th switch 216-N sets all three built-in switches 241 to 243 to the position of L. By this means, N-th switch 216-N is controlled to (1) output a result of butterfly computation of the (N−1)-th step in (N−1)-th butterfly computation section 215-(N−1) with respect to the digital signals accumulated in (1-(N−1))-th data accumulating section 212-(N−1), to (1-N)-th data accumulating section 212-N; and (2) output a result of butterfly computation of the (N−1)-th step in (N−1)-th butterfly computation section 215-(N−1) with respect to the digital signals accumulated in (2-(N−1))-th data accumulating section 214-(N−1), as a result of FFT processing in FFT circuit 200.

Further, (N+1)-th switch 216-(N+1) sets a built-in switch 216-(N+1) to the position of L. By this means, (N+1)-th switch 216-(N+1) is controlled to output a result of butterfly computation of the N-th step in N-th butterfly computation section 215-N with respect to the digital signals accumulated in (1-N)-th data accumulating section 212-N, as a result of FFT processing in FFT circuit 200.

Next, a case will be explained as an example where FFT processing for $2^{N-1}$ points and FFT processing for $2^5$ points are performed.

In this case, first switch 216-1 sets all two built-in switches 221 and 222 to the position of L. By this means, first switch 216-1 is controlled to (1) output an input signal from first buffer 211 to (1-1)-th data accumulating section 212-1 and (2) output an input signal from second buffer 213 to (2-1)-th data accumulating section 214-1.

Further, out of four built-in switches in each of second to (N−1)-th switches 216-2 to 216-(N−1), (i) all switches 231 and switches 232 are set to the position of L, (ii) switches 233 in second to sixth switches 216-2 to 216-6 are set to the position of L and switches 233 in seventh to (N−1)-th switches 216-7 to 216-(N−1) are set to the position of H, respectively, and (iii) switch 234 in second to fifth switches 216-2 to 216-5 are set to the position of L and switches 234 in sixth to (N−1)-th switches 216-6 to 216-(N−1) are set to the position of H, respectively. By this means, each of second to (N−1)-th switches 216-2 to 216-(N−1) is controlled to (1) output results of butterfly computations of the first to (N−2)-th steps in first to (N−2)-th butterfly computation sections 215-1 to 215-(N−2) with respect to the digital signals accumulated in (1-1)-th to (1-(N−2))-th data accumulating sections 212-1 to 212-(N−2), to (1-2)-th to (1-(N−1))-th data accumulating sections 212-2 to 212-(N−1); (2) output results of butterfly computations of the first to fourth steps in first to fourth butterfly computation sections 215-1 to 215-4 with respect to the digital signals accumulated in (2-1)-th to (2-4)-th data accumulating sections 214-1 to 214-4, to (2-2)-th to (2-5)-th data accumulating section 214-2 to 214-5; and (3) output a result of butterfly computation of the fifth step in fifth butterfly computation section 215-5 with respect to the digital signals accumulated in (2-5)-th data accumulating section 214-5, to N-th data accumulating section 216-N.

Further, out of three built-in switches in N-th switch 216-N, N-th switch 216-N sets switch 241, switch 242 and switch 243 to the position of L, the position of H and the position of H, respectively. By this means, N-th switch 216-N is controlled to (1) output a result of butterfly computation of the (N−1)-th step in (N−1)-th butterfly computation section 215-(N−1) with respect to the digital signals accumulated in (1-(N−1))-th data accumulating section 212-(N−1), to (N+1)-th switch 216-(N+1); and (2) output a result of butterfly computation of the fifth step in fifth butterfly computation section 215-5 with respect to the digital signals accumulated in (2-5)-th data accumulating section 214-5, as a result of FFT processing in FFT circuit 200.

Further, (N+1)-th switch 216-(N+1) sets one built-in switch 251 to the position of H. By this means, (N+1)-th switch 216-(N+1) outputs a result of butterfly computation of the (N−1)-th step in (N−1)-th butterfly computation section 215-(N−1) with respect to the digital signals accumulated in (1-(N−1))-th data accumulating section 212-(N−1), as a result of FFT processing in FFT circuit 200.

Next, a case will be explained below as an example where second butterfly computation section 215-2 performs a butterfly computation with a base 4.

In this case, first switch 216-1 sets all two built-in switches 221 and 222 to the position of H, and, out of four built-in switches in second switch 216-2, second switch 216-2 sets switch 231 and switch 233 to the position of H and sets switch 232 and switch 234 to the position of L. Further, first switch 216-1 performs a butterfly computation with a base 4 with respect to the digital signals accumulated in (1-2)-th data accumulating section 212-2 using a coefficient inputted from coefficient accumulating section 140a, and outputs a result of the computation to (1-3)-th data accumulating section 212-3. Further, first switch 216-1 performs a butterfly computation with a base 4 with respect to the digital signals accumulated in (2-2)-th data accumulating section 214-2 using a coefficient inputted from coefficient accumulating section 140a, and outputs a result of the computation to (2-3)-th data accumulating section 214-3. Thus, by changing the number of steps for butterfly computation using switches, it is possible to perform a butterfly computation at different bases.

As described above, according to the present embodiment, in addition to the advantage of Embodiment 1, by changing the number of points in FFT processing arbitrarily using switches, it is possible to perform a plurality of arbitral-point FFT processing at a time and support a plurality of communication scheme flexibly.

(Embodiment 3)

Figure 11:
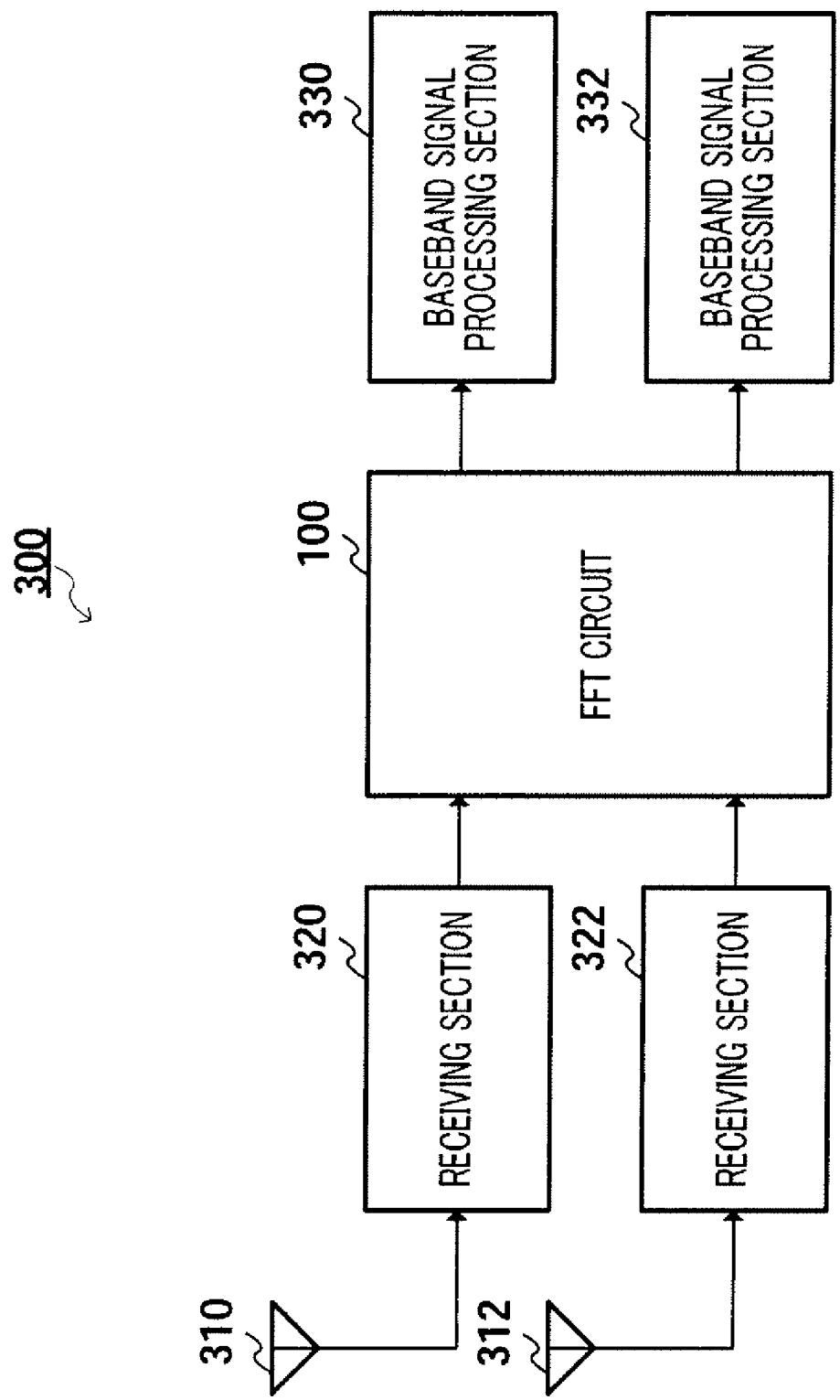
FIG. 11 is a block diagram showing a configuration of the communication apparatus according to Embodiment 3 of the present invention.

FIG. 11 is a block diagram showing the configuration of the communication apparatus according to Embodiment 3 of the present invention. Here, a case will be explained below where FFT circuit of Embodiment 3 is applied to a communication apparatus.

Communication apparatus 300 shown in FIG. 11 employs a configuration having first antenna 310, second antenna 312, first receiving section 320, second receiving section 322, first baseband signal processing section 330 and second baseband signal processing section 332, in addition to FFT circuit 100 of Embodiment 1 shown in FIG. 2.

First receiving section 320 converts a radio frequency signal received at first antenna 310 for the first radio system into a digital signal and outputs the digital signal. Further, second receiving section 232 converts a radio frequency signal received at second antenna 312 for the second radio system into a digital signal and outputs the digital signal.

Here, a case will be explained below as an example where the first radio system is the DVB-H (Digital Video Broadcasting) scheme and the second radio system is the IEEE802.11a scheme.

The DVB-H scheme needs FFT processing for 4096 ($=2^{12}$) points and the IEEE802.11a scheme needs FFT processing for 64 ($=2^{6}$) points, and, consequently, FFT circuit 100 performs FFT processing for N=12 and M=6 in Embodiment 1.

That is, first buffer 111 accumulates 4096 digital signals and second buffer 113 accumulates 64 digital signals. First FFT processing section 110 includes (1-1)-th to (1-5)-th data accumulating sections 112-1 to 112-5, (2-1)-th to (2-5)-th data accumulating sections 114-1 to 114-5, and first to fifth butterfly computation sections 115-1 to 115-5. Further, second FFT processing section 120 includes sixth to twelfth data accumulating sections 121-6 to 121-12, and sixth to twelfth butterfly computation sections 122-6 to 122-12. Further, third FFT processing section 130 includes (2-6)-th data accumulating section 131 and butterfly computation section 132.

Further, as described above, if FFT circuit 100 further includes switches 191 and 192 (see FFT circuit 100c in FIG. 7), for example, if communication is not performed by the IEEE802.11a scheme, by changing switch 191, each of (1-1)-th data accumulating section 112-1 and (2-1)-th data accumulating section 114-1 can accumulate $2^5$ digital signals inputted from first buffer 111, and the combination of (1-1)-th data accumulating section 112-1 and (2-1)-th data accumulating section 114-1 can be assumed to be the one data accumulating section that accumulates $2^6$ digital signals. By this means, it is possible to perform FFT processing faster.

Further, if the communication scheme processed in communication apparatus 300 changes, it is possible to use FFT circuit 200 in Embodiment 2. For example, if the communication scheme processed by second receiving section 322 and second baseband signal processing section 332 is changed from IEEE802.11a to IEEE802.11b, by setting switch 222 in first switch 216-1 to the position of H, setting all switches 233 and switches 234 in second to (N−1)-th switches 216-2 to 216-(N−1) to the position of H and setting switch 243 in N-th switch 216-N to the position of H, it is possible to directly output from FFT circuit 200, the digital signals accumulated in second buffer 213. By this means, it is possible to flexibly support communication schemes that do not require FFT processing.

For example, if the communication scheme processed by first receiving section 320 and first baseband signal processing section 330 is changed from the DVB-H scheme to the 2K mode of the DVB-T scheme, FFT processing for 2048 ($=2^{11}$) points needs to be performed. When FFT circuit 200 is formed by N=12, by changing the setting of both switch 242 in N-th switch 216-N and switch 251 in (N+1)-th switch 216-(N+1) from the position of L to the position of H, it is possible to change the number of points in FFT processing from 4096 to 2048.

By this means, it is possible to provide a communication apparatus that optimizes resources for computation and flexibly support a plurality of communication schemes requiring FFT processing.

The present application is based on Japanese Patent Application No. 2005-340148, filed on Nov. 25, 2005, the entire content of which is expressly incorporated by reference herein.

Industrial Applicability

The present invention has an advantageous effect of optimizing resources for computation, while supporting a plurality of communication schemes, and is therefore useful for a multimode communication apparatus supporting a plurality of communication schemes, and is adequate for miniaturizing an apparatus and saving power consumption.

The invention claimed is:

1. A fast Fourier transform circuit, comprising:
    a first buffer that accumulates $2^N$ (N is a natural number) digital signals and outputs a first buffer digital signal in which an order of bits is rearranged into a position of a bit reversed order where the order of the bits is reversed;
    a second buffer that accumulates $2^M$ (M is a natural number and is equal to or less than N) digital signals and outputs a second buffer digital signal in which an order of bits is rearranged into a position of a bit reversed order;
    a first fast Fourier transform processing section that performs first butterfly computation processing every $2^{M-1}$ digital signals in (M−1) steps on the first buffer digital signal and outputs a first butterfly processed digital signal and performs second butterfly computation processing every $2^{M-1}$ digital signals in (M−1) steps on the second buffer digital signal and outputs a second butterfly processed digital signal;
    a second fast Fourier transform processing section that performs third butterfly computation processing every $2^N$ digital signals in (N-M+1) steps on the first butterfly processed digital signal; and
    a third fast Fourier transform processing section that performs fourth butterfly computation processing every $2^M$ digital signals in one step on the second butterfly processed digital signal.

2. The fast Fourier transform circuit according to claim 1, wherein the first fast Fourier transform processing section shares a coefficient for use between the first butterfly computation processing and the second butterfly computation processing.

3. The fast Fourier transform circuit according to claim 1, wherein at least one of the third butterfly computation processing and the fourth butterfly computation processing performed in the second fast Fourier transform processing section comprises pipelined fast Fourier transform processing.

4. The fast Fourier transform circuit according to claim 1, wherein at least one of the third butterfly computation processing and the fourth butterfly computation processing performed in the second fast Fourier transform processing section comprises memory-based fast Fourier transform processing.

5. The fast Fourier transform circuit according to claim 1, wherein the first Fourier transform processing section comprises a switch that switches a buffer output supplied to the first butterfly computation processing and the second butterfly computation processing, and switches the switch to perform the first butterfly computation processing and the second butterfly computation processing on a digital signal outputted from one of the first buffer and the second buffer.

6. A communication apparatus comprising the fast Fourier transform circuit according to claim 1.

7. A fast Fourier transform circuit, comprising:
    a first buffer that accumulates $2^N$ (N is a natural number) digital signals and outputs a first buffer digital signal in which an order of bits is rearranged into a position of a bit reversed order where the order of the bits is reversed;
    a second buffer that accumulates $2^M$ (M is a natural number and is equal to or less than N) digital signals and outputs a second buffer digital signal in which an order of bits is rearranged into a position of a bit reversed order;
    a first fast Fourier transform processing section that performs first butterfly computation processing every $2^{M-1}$ digital signals in (M−1) steps on the first buffer digital signals and outputs a first butterfly processed digital signal and performs second butterfly computation processing every $2^{M-1}$ digital signals in (M−1) steps on the second buffer digital signal and outputs a second butterfly processed digital signal;
    a second fast Fourier transform processing section that performs third butterfly computation processing every $2^M$ digital signals in one step on the first butterfly processed digital signal and outputs a third butterfly processed digital signal and performs fourth butterfly computation processing every $2^M$ digital signals in one step on the second butterfly processed digital signal; and
    a third fast Fourier transform processing section that performs fifth butterfly computation processing every $2^N$ digital signals in (N-M) steps on the third butterfly processed digital signal.

8. The fast Fourier transform circuit according to claim 7, wherein:
    the first fast Fourier transform processing section shares a coefficient for use between the first fast butterfly computation processing and the second butterfly computation processing; and
    the second fast Fourier processing section shares a coefficient for use between the third butterfly computation processing and the fourth butterfly computation processing.

9. The fast Fourier transform circuit according to claim 7, wherein the fifth butterfly computation processing performed in the third fast Fourier transform processing section comprises pipelined fast Fourier transform processing.

10. The fast Fourier transform circuit according to claim 7, wherein the fifth butterfly computation processing performed in the third fast Fourier transform processing section comprises memory-based fast Fourier transform processing.

11. The fast Fourier transform circuit according to claim 7, wherein the first Fourier transform processing section comprises a switch that switches a buffer output supplied to the first butterfly computation processing and the second butterfly computation processing, and switches the switch to perform the first butterfly computation processing and the second butterfly computation processing on a digital signal outputted from one of the first buffer and the second buffer.

12. A communication apparatus comprising the fast Fourier transform circuit according to claim 7.

13. A fast Fourier transform circuit, comprising:
    a first buffer that accumulates $2^N$ (N is a natural number) digital signals and outputs a first buffer digital signal in which an order of bits is rearranged into a position of a bit reversed order where the order of the bits is reversed;
    a second buffer that accumulates $2^{N-1}$ digital signals and outputs a second buffer digital signal in which an order of bits is rearranged into a position of a bit reversed order;
    N data accumulating sections that are serially connected, wherein a first N data accumulating section is connected to the first buffer and each N data accumulating section accumulates digital signals;
    (N−1) data accumulating sections that are serially connected, wherein a first (N−1) data accumulating section is connected to the second buffer and each N data accumulating section accumulates the digital signals;
    N butterfly computation sections that perform butterfly computation processing of the first step to the N-th step on the digital signals accumulated in the N data accumulating sections and perform butterfly computation processing of the first step to the (N−1)-th step on the digital signals accumulated in (N−1) data accumulating sections; and N switches, wherein a first switch switches an output destination of the digital signals input to a next data accumulating section or a switch in a next stage, and a second to N-th switches that switch the output destination of the digital signals input from a switch in a preceding stage or a preceding butterfly computation section to the next data accumulating section or the switch in the next stage, and wherein the N switches each output the inputted digital signals to a next data accumulating section or a switch in a next stage according to a setting.

14. A communication apparatus comprising the fast Fourier transform circuit according to claim 13.

* * * * *